United States Patent [19]
Hoshi et al.

[11] Patent Number: 6,088,090
[45] Date of Patent: *Jul. 11, 2000

[54] INCLINATION MEASURING APPARATUS

[75] Inventors: Tadahiko Hoshi, Tokyo; Masahiro Nakamura, Yokohama, both of Japan

[73] Assignee: Nikon Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/032,526

[22] Filed: Feb. 27, 1998

[30] Foreign Application Priority Data

Feb. 28, 1997 [JP] Japan ..................................... 9-045563

[51] Int. Cl.[7] .............................. G01B 11/26; G01C 1/00
[52] U.S. Cl. ...................................... 356/139.1; 356/152.2
[58] Field of Search ................................ 356/139.1, 152.2

[56] References Cited

U.S. PATENT DOCUMENTS

| | | | |
|---|---|---|---|
| 3,601,613 | 8/1971 | Hock . | |
| 3,617,131 | 11/1971 | Taguchi | 356/139.1 |
| 4,159,422 | 6/1979 | Okubo | 356/139.1 |
| 5,392,112 | 2/1995 | Nakamura | 356/139.1 |

FOREIGN PATENT DOCUMENTS

| | | | |
|---|---|---|---|
| 360183511 | 9/1985 | Japan | 356/139.1 |
| 1052864 | 11/1983 | U.S.S.R. | 356/139.1 |

*Primary Examiner*—Stephen C. Buczinski

[57] ABSTRACT

Optics-based inclination measuring apparatus (10) for measuring an inclination angle $\theta$ relative to the horizontal. The apparatus includes a lens (20), a light source (30), a sensor (34) having one or more sensor sections, and a container (40) having a non-opaque near-wall (44). The container contains a liquid (54) having a free surface (60). A light beam (80) from the light source passes through the lens, through the non-opaque container wall and reflects off the free liquid surface. The light beam then passes back through the lens and impinges on the sensor, forming an image, such as a spot image. The location of the spot image on the sensor depends on the inclination angle of the inclination measuring device. Signal ratios from the sensor sections are used to determine the relative location of the spot image and hence the inclination angle.

23 Claims, 7 Drawing Sheets

INCLINATION MEASURING APPARATUS

FIELD OF THE INVENTION

The present invention relates to apparatus for measuring inclination, and in particular to optics-based inclination measuring apparatus.

BACKGROUND OF THE INVENTION

Apparatus for accurately measuring the inclination of equipment with respect to the vertical (as defined by the direction of gravity) are important in areas such as surveying, construction, manufacturing, and equipment operation. One particular type of inclination measuring apparatus capable of detecting inclination in two dimensions is optics-based and detects inclination by measuring the reflection of a light beam off an unconstrained ("free") liquid surface. This is possible because a free liquid surface remains perfectly horizontal (or, more specifically, always lies along the gravitational equipotential surface) regardless of the inclination of the container in which it resides. Conventional optics-based inclination measuring apparatus require separate projection and light receiving lenses, and further require the use of a large number of parts, such as prisms. Consequently, conventional optics-based inclination measuring apparatus tend to be relatively large and costly. In addition, their accuracy depends on the alignment of certain of the optical components therein, and therefore suffers when optical misalignment occurs.

A conventional optics-base inclination measuring apparatus is set forth in U.S. Pat. No. 5,392,112. The apparatus disclosed therein includes a housing containing optical elements and a light source. The optical elements are arranged such that a beam of light from the light source is split into two beams by a half-mirror provided in the light path between the light source and the free surface of a liquid held in a container. One light beam is reflected by the free liquid surface and falls on a line sensor. The other light beam falls on the line sensor without being reflected by the free liquid surface. Thus, when the housing is inclined, the relative positions of the light beams on the line sensor changes. Thus, the inclination angle relative to the liquid surface is determined based on the relative position of the two beams as sensed by the sensor.

SUMMARY OF THE INVENTION

The present invention relates to an apparatus for measuring an inclination angle, and in particular to optics-based inclination measuring apparatus. The inclination measuring apparatus of the present invention includes a lens having an optical axis, a front focal plane and a rear focal plane. A light source is disposed adjacent the lens at or near the front focal plane. A container is disposed adjacent the lens at or near the rear focal plane, the container having at least one non-opaque wall. A liquid is contained within the container, the liquid having a free surface so that it remains horizontal by virtue of gravity, irrespective of the orientation of the container. A light sensor is also disposed adjacent the lens at or near the front focal plane. In one aspect of the invention, the rear focal plane and the free liquid surface are substantially coplanar when the inclination measuring apparatus is in the non-inclined state.

The inclination measuring apparatus of the present invention works as follows. A light beam emanates from the light source and passes through the lens a first time, whereupon the light beam becomes more collimated. The light beam then passes through the non-opaque wall of the container, whereupon it reflects off the free liquid surface and back through the non-opaque wall. The light beam then passes through the lens a second time and is refocused onto the sensor.

In one aspect of the invention, a beam splitter is placed between the lens and the light source. This creates a second optical axis, a second front focal point and a second front focal plane. A sensor is then placed at or near the second front focal point. Thus, the light beam, after being refracted by the lens a second time, is partially diverted along the second optical axis and toward the sensor.

In another aspect of the present invention, the light sensor includes two or more sensor sections so that light falls on each section in different amounts depending on the inclination angle of the inclination measuring apparatus. The ratio of the signals from each sensor section is then used to determine the inclination angle.

DETAILED DESCRIPTION OF THE INVENTION

Figure 1:
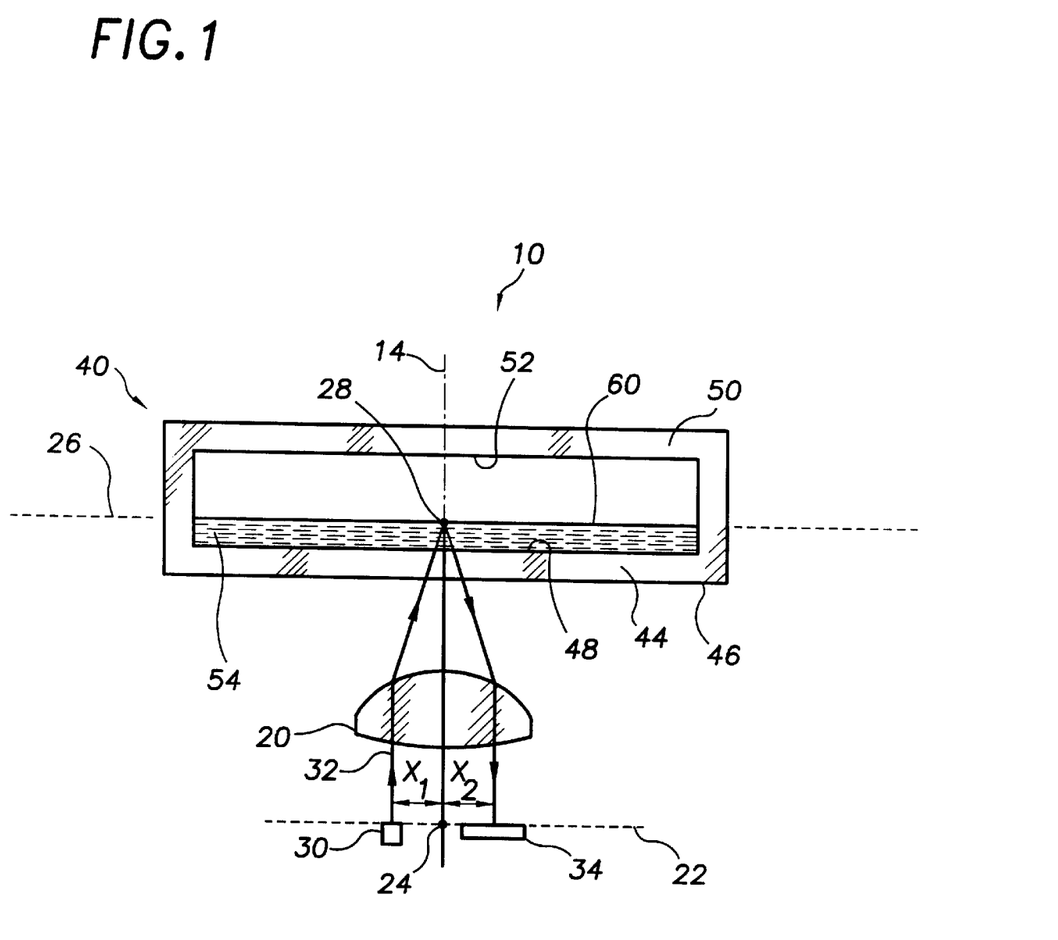
FIG. 1 is a cross-sectional view of the inclination measuring apparatus according to a first preferred embodiment of the present invention.

The present invention relates to an apparatus for measuring inclination, and in particular to optics-based inclination measuring apparatus. Referring to FIG. 1, inclination measurement apparatus 10 includes an optical axis 14 along which is disposed a lens 20. Lens 20 includes a front focal plane 22 and a front focal point 24 located at the intersection of front focal plane 22 and optical axis 14. Lens 20 also includes a rear focal plane 26 and a rear focal point 28 located at the intersection of rear focal plane 24 and optical axis 14. A light source 30 is disposed adjacent lens 20 at or proximate front focal plane 22 and a distance $X_1$ to one side of optical axis 14. Light source 30 may be, for example, a light-emitting diode, a small laser (such as a semiconductor laser (laser diode)) or any other well-known small, relatively bright light source capable of producing light at one or more wavelengths. A light ray 32 is shown emanating from light source 30 and traveling through inclination measuring device 10.

A light sensor 34 is also disposed at or proximate front focal plane 22 of lens 20 a distance $X_2$ away of optical axis 14 and opposite light source 30. In a preferred embodiment, $X_2=X_1$, in which case light source 30 and sensor 34 are symmetrically positioned about optical axis 14. In a preferred embodiment, sensor 34 is divided into multiple sections, such as a four-section silicon photodiode or a charge-coupled device (CCD) area sensor, as discussed further below.

With continued reference to FIG. 1, a container 40 is disposed along optical axis 14 adjacent lens 20 on the side opposite light source 30 and sensor 34. Container 40 includes a near-wall 44 closest to lens 20. Near-wall 44 has an outer surface 46 and an inner surface 48. Near-wall 44 is non-opaque to the wavelength(s) of light emitted by light source 30. Container 40 also includes a far wall 50, farthest from lens 20, with an inner surface 52. Container 40 contains a liquid 54 which may be, for example, water, alcohol, glycerin, silicon oil, mineral oil or the like. In a preferred embodiment, liquid 54 has an index of refraction that is as close as possible to the index of refraction of the material comprising near-wall 44. This results in the interface between liquid 54 near-wall 44 having a minimal reflectivity, the importance of which is discussed below. Liquid 54 also has a free surface 60 which is arranged to be co-planar with rear focal plane 26 when inclination measuring apparatus 10 is in the non-inclined state, as is shown in FIG. 1. Note that in FIG. 1, liquid 54 is shown to be in contact with inner surface 48 of near-wall 44. In another preferred embodiment of the present invention, liquid 54 is in contact with inner surface 52 of far wall 50, i.e., inclination measuring device 10 of FIG. 1 is used "upside-down."

Figure 2A:
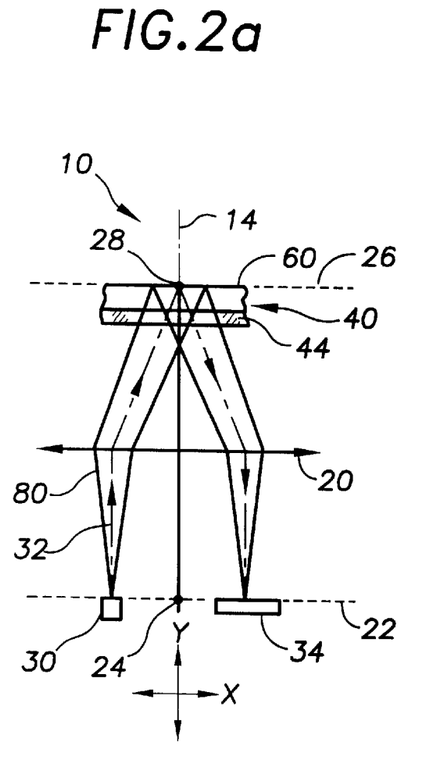
FIG. 2a is an optical path diagram of the inclination measuring apparatus of FIG. 1 in the non-inclined state.

The operation of inclination measuring apparatus 10 is now described with reference to FIGS. 2a, 2b and 3a–3c. Referring first to FIG. 2a, a diverging light beam 80 emanates from light source 30 (shown disposed in front focal plane 22) and travels toward lens 20 along an optical path defined by light ray 32. For the sake of simplicity, lens 20 is drawn in the standard schematic optics representation of a thin, positive lens. Light beam 80 is refracted upon passing through lens 20, whereupon it becomes more collimated and is re-directed toward rear focal point 28. As light beam 80 heads toward rear focal point 28, it passes through near-wall 44 of container 40. Light beam 80 then reflects off free liquid surface 60 and is re-directed back through near-wall 44 and towards lens 20. Upon passing again through lens 20, light beam 80 is refracted and is made to converge and focus onto sensor 34 (shown disposed in front focal plane 22). Thus, as shown in FIG. 2a, the optical path of light beam 80 follows light ray 32 and is symmetrical with respect to optical axis 14 when inclination measuring apparatus 10 is in the non-inclined state. Accordingly, with reference to FIG. 3a, an image in the form of a light spot 90 is formed in the center 94 of sensor 34.

Figure 3A:
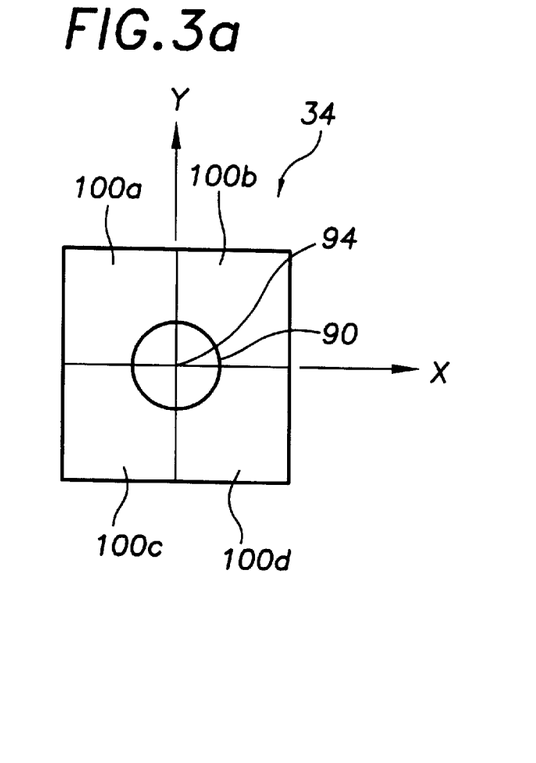
FIG. 3a depicts a light spot image formed on a preferred sensor when the inclination measuring apparatus of the present invention is in the non-inclined state.

With continuing reference to FIG. 3a, sensor 34 has a total surface area S (not shown) and is divided into four light-sensitive sensor sections 100a–100d, each with area S/4 (not shown). Sensor sections 100a–100d intersect at center 94, which is centered on the optical path defined by light ray 32. Thus, when light spot 90 is centered about center 94, the light contained in light spot 90 is distributed evenly on each sensor section 100a–100d. The non-inclined state of inclination measuring apparatus 10 is therefore established when each sensor section 100a–100d receives equal amounts of light. In practice however, the distribution of light in light spot 90 may not be perfectly uniform due to, for example, a non-uniform distribution of light emitted from light source 30. Also, there may be differences in light detection sensitivity between sensor sections 100a–100d. Thus, certain of sensor sections 100a–100d may receive more light than others even though inclination measurement apparatus 10 is in the non-inclined state. These type of errors are accounted for by mechanically adjusting sensor sections 100a–100d or electrically adjusting the output differential between the sensor sections.

Figures 3B, 3C:
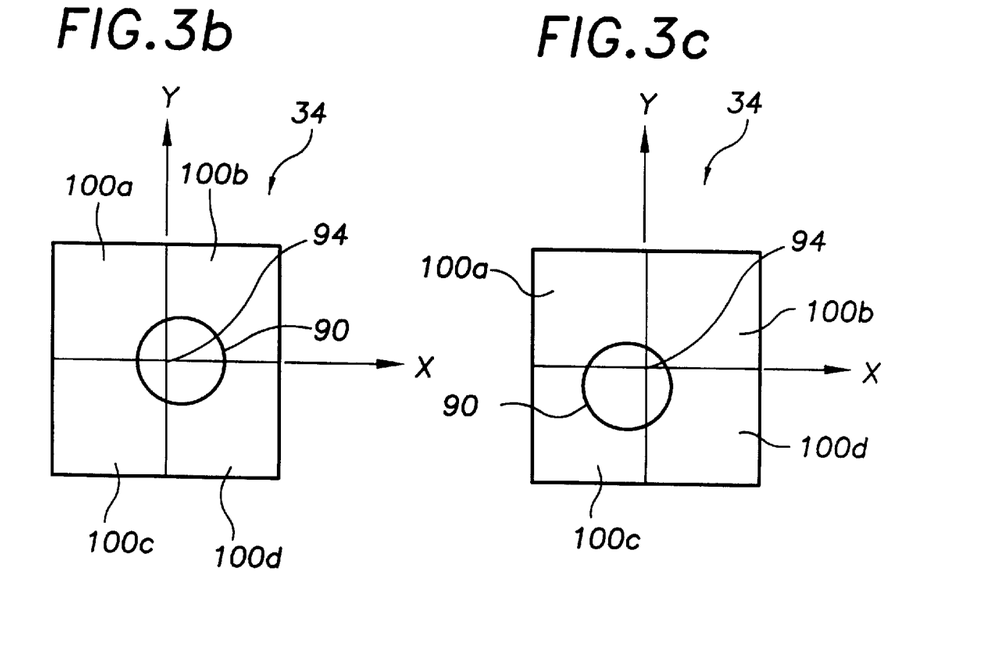
FIG. 3b depicts a light spot image formed on a preferred sensor when the inclination measuring apparatus of the present invention is in a one-dimensionally inclined state.
FIG. 3c depicts a light spot image formed on a preferred sensor when the inclination measuring apparatus of the present invention is in a two-dimensionally inclined state.

In a preferred embodiment, light spot 90 is round, as is shown in FIGS. 3a–3c. The most direct way is to obtain a round light spot is to use a light source 30 having either a round emission surface or a circularly symmetric emission pattern, as in certain types of LEDs. However, if light source 30 does not have a round emission surface, then a round aperture stop (not shown) can be provided on light source 30. In another preferred embodiment, light spot 90 is not round, but is any rotationally symmetric shape. In yet another preferred embodiment, an aperture stop having the desired shape can be provided. If an aperture stop is provided in front focal plane 22 of lens 20, then light source 30 can be positioned away from front focal plane 22. Finally, in an additional preferred embodiment, light spot 90 can have an arbitrary shape (whether due to the emission pattern of light source 30 or the shape of an aperture stop). In this embodiment, the amount of light falling on each sensor section 100a–100d as a function of inclination angle can be analytically or empirically determined.

Figure 2B:
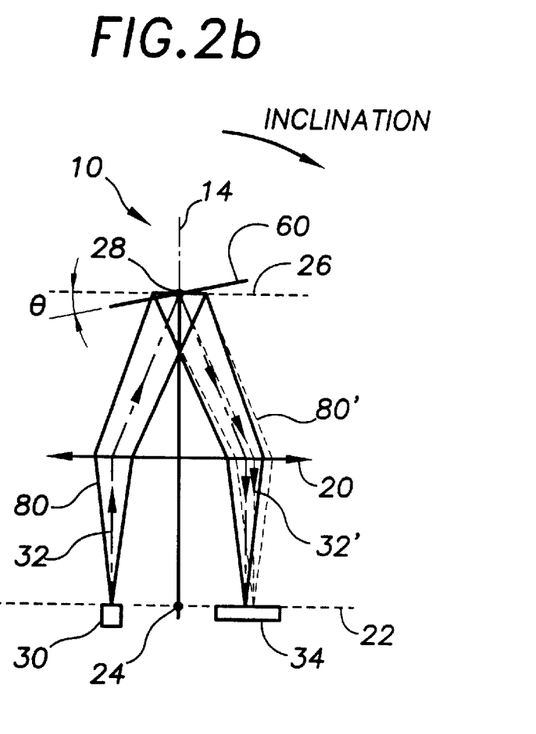
FIG. 2b is an optical path diagram of the inclination measuring apparatus of FIG. 1 in an inclined state.

With reference now to FIG. 2b and FIG. 1, if inclination measuring apparatus 10 is inclined by an inclination angle θ with respect to rear focal plane 26, free liquid surface 60 remains horizontal by virtue of gravity. FIG. 2b is shown in the frame of reference of inclination measuring apparatus 10 and is also shown inclined only in one dimension, for the sake of illustration. Light beam 80 emanates from light source 30 and travels toward lens 20 along an optical path defined by light ray 32. Light beam 80 is refracted upon passing through lens 20, whereupon it becomes more collimated and is re-directed toward rear focal point 28. As light beam 80 heads toward rear focal point 28, it passes through near-wall 44 of container 40 (see FIG. 1). Light beam 80 then reflects off free liquid surface 60, which is inclined at an inclination angle θ with respect to rear focal surface 26, and becomes inclined light beam 80' with inclined light ray 32'. Inclined light beam 80' is re-directed through near-wall 44 (see FIG. 1) and towards lens 20 along an optical path defined by inclined light ray 32'. Upon passing again through lens 20, light beam 80' is refracted and made to converge and focus onto sensor 34 (shown disposed in front focal plane 22). Thus, as shown in FIG. 2b, the optical path of light beam 80' follows inclined light ray 32' and is asymmetrical with respect to optical axis 14 when inclination measuring apparatus 10 is in an inclined state. Accordingly, with reference to FIGS. 3b and 3c, light spot 90 is decentered from center 94 of sensor 34 in the direction of inclination, as indicated in FIG. 2b.

With reference to FIGS. 3b and 3c, light spot 90 is decentered due to inclination measuring apparatus 10 being inclined. Consequently, the amount of light falling on each of sensor sections 100a–100d differs. For example, with reference to FIG. 3b, light spot 90 is decentered in the X-direction, indicating a one-dimensional inclination. Consequently, sensor sections 100a and 100c receive less light and sensor sections 100b and 100d receive more light as compared to when light spot 90 is centered (FIG. 3a). Likewise, with reference to FIG. 3c, light spot 90 is decentered in both the X- and Y-directions, indicating a two-dimensional tilt. Consequently, sensor section 100c receives more light, sensor section 100b receives less light, and sensor sections 100a and 100d both receive less (but equal amounts) of light as compared to when light spot 90 is centered (FIG. 3a). A control circuit (not shown FIGS. 3a–3c) calculates the ratio of signals from sensor sections 100a–100d, from which inclination angle θ (in one or two dimensions) is derived.

There are several significant advantages to the above-described preferred embodiment of inclination measuring apparatus 10 as shown in FIG. 1. With reference to FIGS. 1, 2a and 2b, a first advantage is that lens 20 acts as both a projection lens and a taking lens. This in itself allows for a small number of parts and a simple, low cost design. Moreover, by arranging light source 30 and sensor 34 symmetrically about optical axis 14, a further reduction in the number of parts and overall cost is achieved.

With continuing reference to FIGS. 1, 2a and 2b, a second advantage is that light rays 32 and 32' are parallel to optical axis 14 on the front-focal-plane side of lens 20. In other words, inclination measuring apparatus 10 is telecentric. Accordingly, displacement of light source 30 or sensor 34 in a direction parallel to optical axis 14 (i.e., along light rays 32 or 32') results in a symmetric blurring (i.e., defocusing) of light spot 90. A symmetric blurring does not change the relative amount of light falling on each of sensor sections 100a–100d and so does not affect the accuracy of the inclination angle measurement. This allows for a relaxed tolerance on the positioning accuracy of light source 30 and sensor 34 with respect to the direction parallel to optical axis 14.

Figure 4:
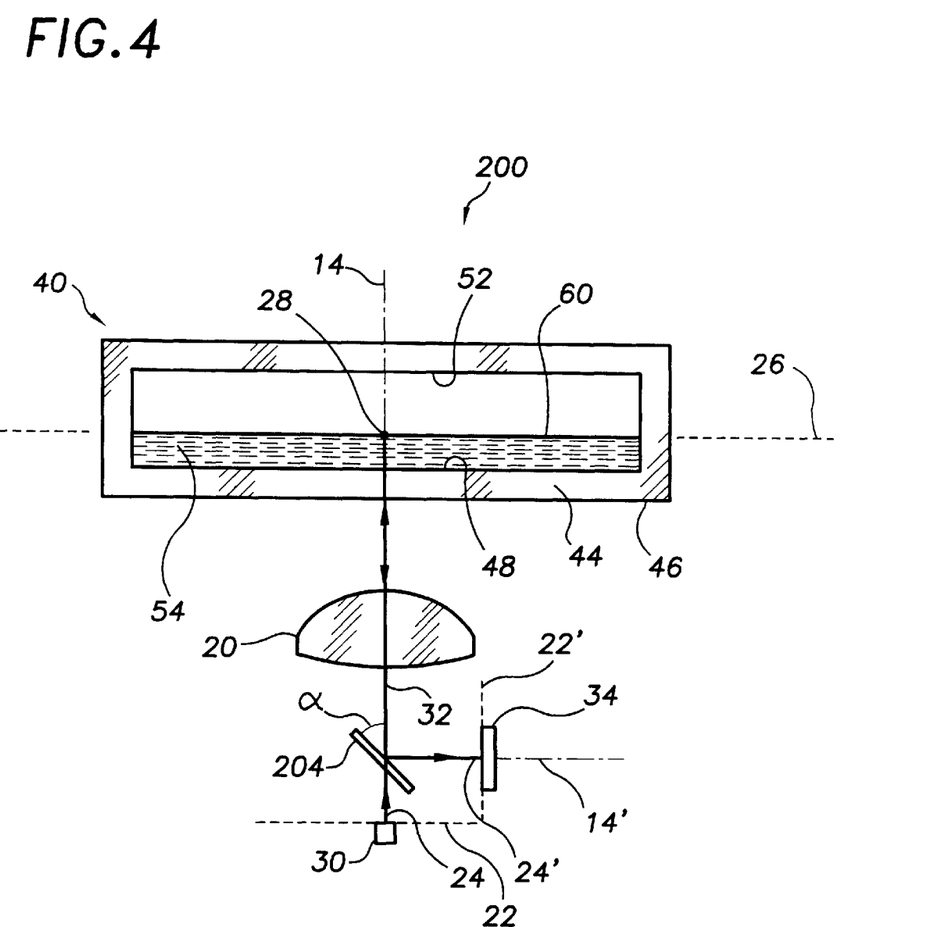
FIG. 4 is a cross-sectional view of the inclination measuring apparatus according to a second preferred embodiment of the present invention.
Figure 5A:
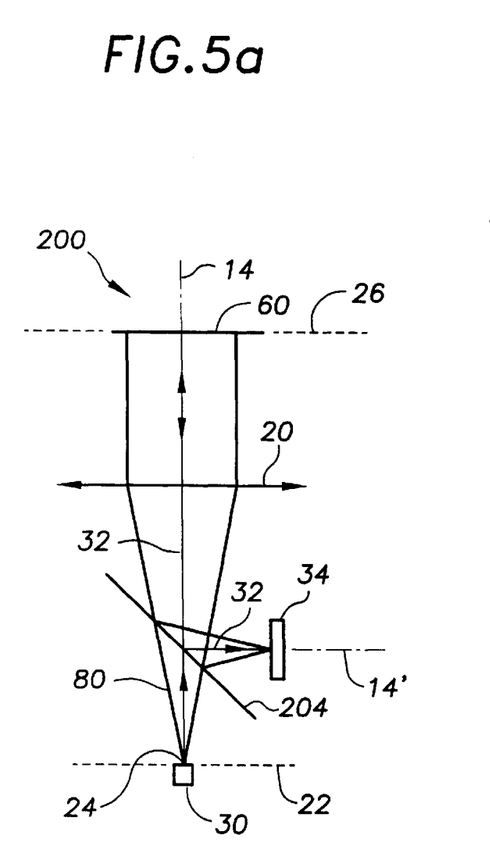
FIG. 5a is an optical path diagram of the inclination measuring apparatus of FIG. 4 in the non-inclined state.
Figure 5B:
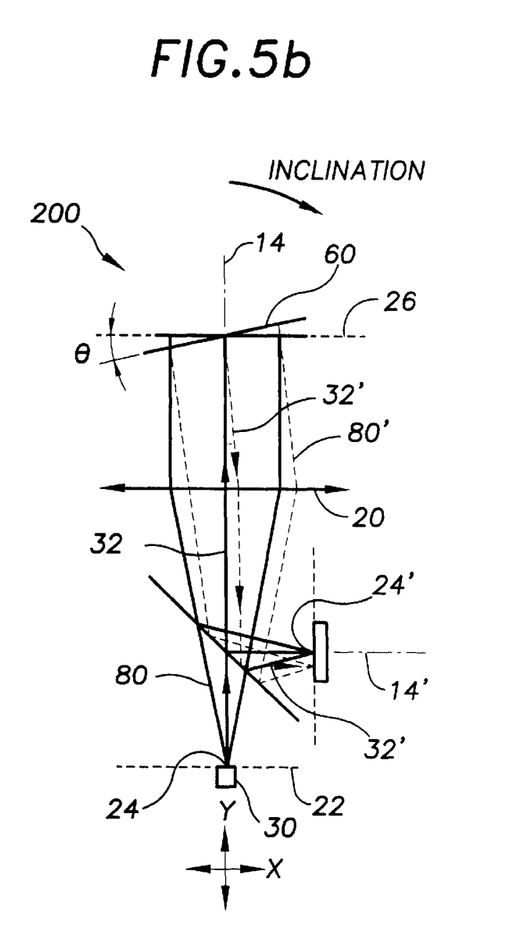
FIG. 5b is an optical path diagram of the inclination measuring apparatus of FIG. 4 in an inclined state.

A second preferred embodiment of the present invention is now described with respect to FIGS. 4, 5a and 5b. With reference first to FIG. 4, there is shown an inclination measuring apparatus 200 having the same constituent parts as inclination measuring device 10, but with light source 30 and sensor 34 in different positions. In inclination measuring device 200, light source 30 is disposed along optical axis 14 at or proximate front focal point 24. Light ray 32 thus travels along optical axis 14. Also, disposed along optical axis 14 between light source 30 and lens 20 is a beam splitter 204 oriented at an angle α with respect to optical axis 14. Beam splitter 204 may be, for example, a half-mirror (i.e., a mirror with 50% transmission) as is shown in FIG. 4, a prism, or a beam splitting cube. When beam splitter 204 is disposed along optical axis 14 at an angle α=45°, a second optical axis 14' is formed at right-angles to optical axis 14. In addition, a second focal point 24' is formed along optical axis 14 and a second front focal plane 22' is formed at right-angles to optical axis 14' at second front focal point 24'. Sensor 34 is disposed along optical axis 14' at or proximate second front focal point 24'. In a preferred embodiment, light source 30 is disposed at front focal point 24 and sensor 34 is disposed at second front focal point 24' i.e., at a position conjugate to light source 30.

The operation of inclination measuring apparatus 200 is now described with reference to FIGS. 4, 5a and 5b. With reference first to FIG. 5a, diverging light beam 80 emanates from light source 30 and travels toward lens 20 along an optical path defined by light ray 32. Light beam 80 is refracted upon passing through lens 20, whereupon it becomes collimated and is directed toward rear focal plane 26. As light beam 80 heads toward rear focal plane 26, it passes through near-wall 44 of container 40 (see FIG. 4). Light beam 80 then reflects off free liquid surface 60 and is re-directed back along the same optical path through near-wall 44 and towards lens 20. Upon passing again through lens 20, light beam 80 is refracted and made to converge back onto light source 30. However, before light beam 80 reaches light source 30, it is partially reflected by beam splitter 204 and is thus partially redirected along optical axis 14' to converge on sensor 34. Accordingly, with reference to FIG. 3a, light spot 90 is formed at center 94 of sensor 34.

With reference now to FIG. 5b, if inclination measuring apparatus 200 is inclined by an angle θ with respect to rear focal plane 26, free liquid surface 60 remains horizontal by virtue of gravity. FIG. 5b is shown in the frame of reference of inclination measuring apparatus 200 and is shown tilted in only one direction for the sake of illustration. Light beam 80 emanates from light source 30 and travels toward lens 20 along an optical path defined by light ray 32 travelling along optical axis 14. Light beam 80 is refracted upon passing through lens 20, whereupon it becomes collimated and is re-directed toward rear focal plane 26. As light beam 80 heads toward rear focal plane 26, it passes through near-wall 44 of container 40 (see FIG. 4). Light beam 80 then reflects off free liquid surface 60, which is tilted at an angle θ with respect to rear focal plane 26, and becomes inclined light beam 80'. Inclined light beam 80' is re-directed through near-wall 44 (see FIG. 4) and towards lens 20 along an optical path defined by inclined light ray 32'. Upon passing again through lens 20, light beam 80' is refracted and is made to converge to front focal plane 22. However, before light beam 80' reaches front focal plane 22, it is partially reflected by beam splitter 204 and is thus partially directed along optical axis 14' to converge on sensor 34. Thus, as shown in FIG. 5b, the optical path of light beam 80' is asymmetrical with respect to optical axis 14 when inclination measuring apparatus 200 is in an inclined state. Accordingly, with reference to FIGS. 3b and 3c, light spot 90 is decentered from center 94 of sensor 34 in the direction of inclination. Angle of inclination θ is determined from the ratio of signals from sensor sections 100a–100d (see FIGS. 3a–3c) in the same manner as discussed above with respect to inclination measuring apparatus 100.

There are several significant advantages to the above-described preferred embodiment of inclination measuring apparatus 200. With reference to FIGS. 5a and 5b, it can be seen that, since light source 30 is located along optical axis 14, light beams 80 and 80' pass through nearly the same part of lens 20. Consequently, the diameter of lens 20 in inclination measuring apparatus 200 can be made even smaller than that in inclination measuring device 10.

Another advantage is the telecentric design of inclination measuring apparatus 200, as described above with respect to inclination measuring apparatus 10. The telecentric design allows for the positioning accuracy light source 30 in the Y-direction (i.e., along optical axis 14) to be relaxed, and the positioning accuracy of sensor 34 in the X-direction (i.e., along optical axis 14') to be relaxed. However, the positioning accuracy of light source 30 becomes more important as the degree of collimation of light beam 80 decreases.

The description of the embodiments of the present invention as set forth above were with regard to sensor 34 (FIGS. 3a–3c), which is shown as having four sensor sections 100a–100d for the sake of illustration. However, it will be understood that many different types of sensors are applicable to the present invention, including position-sensitive devices (PSDs) or charge-coupled devices (CCDs). Further, a variety of forms for these types of sensors are possible, such as line sensors arranged at right angles to one another. For example, with reference to FIG. 6, sensor 300 includes two line-sensors 304 and 306 arranged to lie along the X-direction and Y-direction, respectively. When a sensor such as sensor 300 is employed, an L-shaped aperture stop may be provided at or near light source 30 or alternatively, in front focal plane 22 with light source 30 being displaced therefrom (see FIGS. 1 and 4). This results in an L-shaped image 310 being formed on sensor 300, and in particular on line-sensors 304 and 306, as shown. Thus, when inclination measuring apparatus 10 or 200 is inclined, L-shaped image 310 moves in proportion to inclination angle θ. This allows for the amount of movement to be correlated with signals from line sensors 304 and 306, and from these signals, inclination angle θ (in one or two dimensions) can be deduced.

Figure 6:
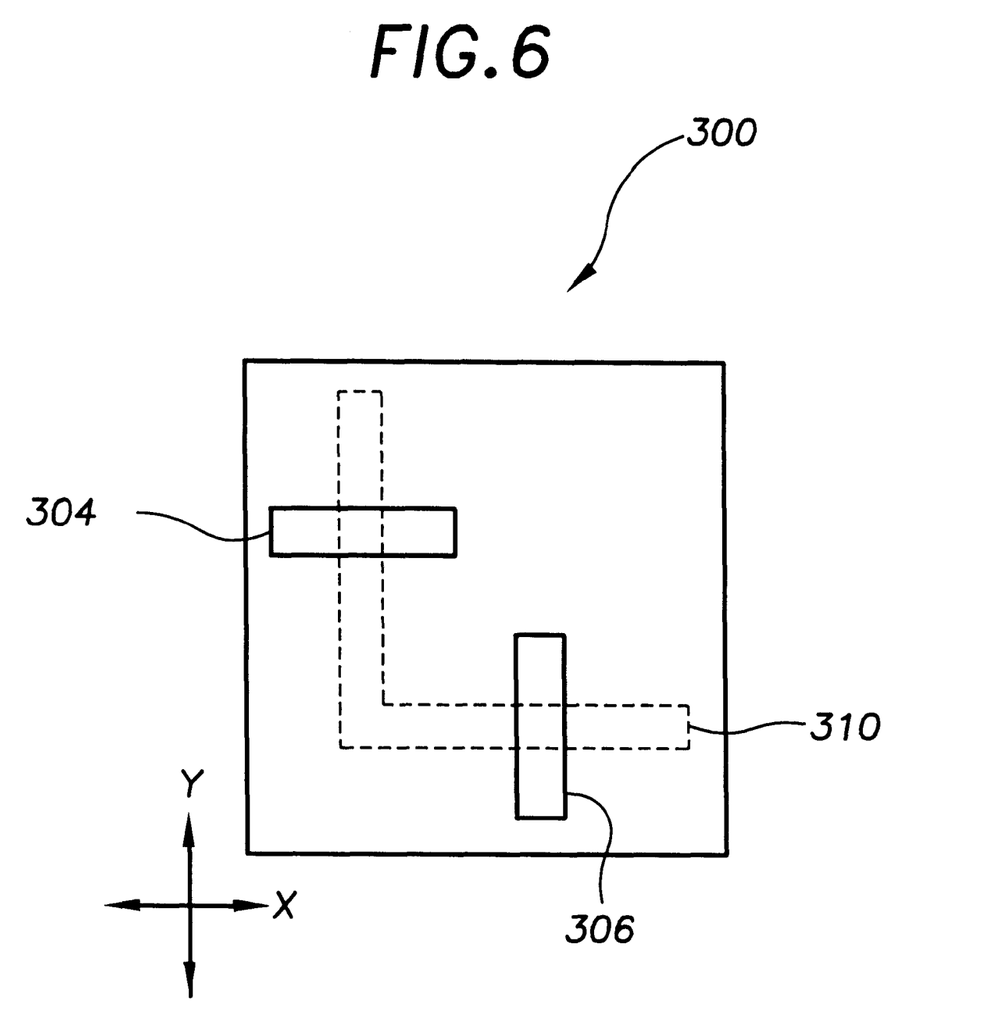
FIG. 6 is a plan view of a preferred sensor used in the inclination measuring apparatus of the present invention.

If PSD or CCD-type area or line sensors, such as sensor 300 of FIG. 6 are employed, the inclination measurement accuracy can be increased if the image formed on the sensor is finely focused. If a finely focused image is used, then light source 30 and the particular sensor (e.g., sensor 300) can be located in front focal plane 22 of lens 20 (see FIGS. 2a, 2b and 5a, 5b). Conversely, if a large-area sensor, such as sensor 34 (see FIGS. 3a–3c) are employed, an extended image of light source 30 is preferred so that a sufficient amount of light is incident on each sensor section to obtain an accurate measurement of inclination angle θ. As mentioned above, because the above-described embodiments of the present invention are telecentric, the size of the light source image (such as light spot 90 in FIGS. 3a–3c) can be increased by defocusing either light source 30 or sensor 34 without affecting the accuracy of the inclination measurement.

Figure 7:
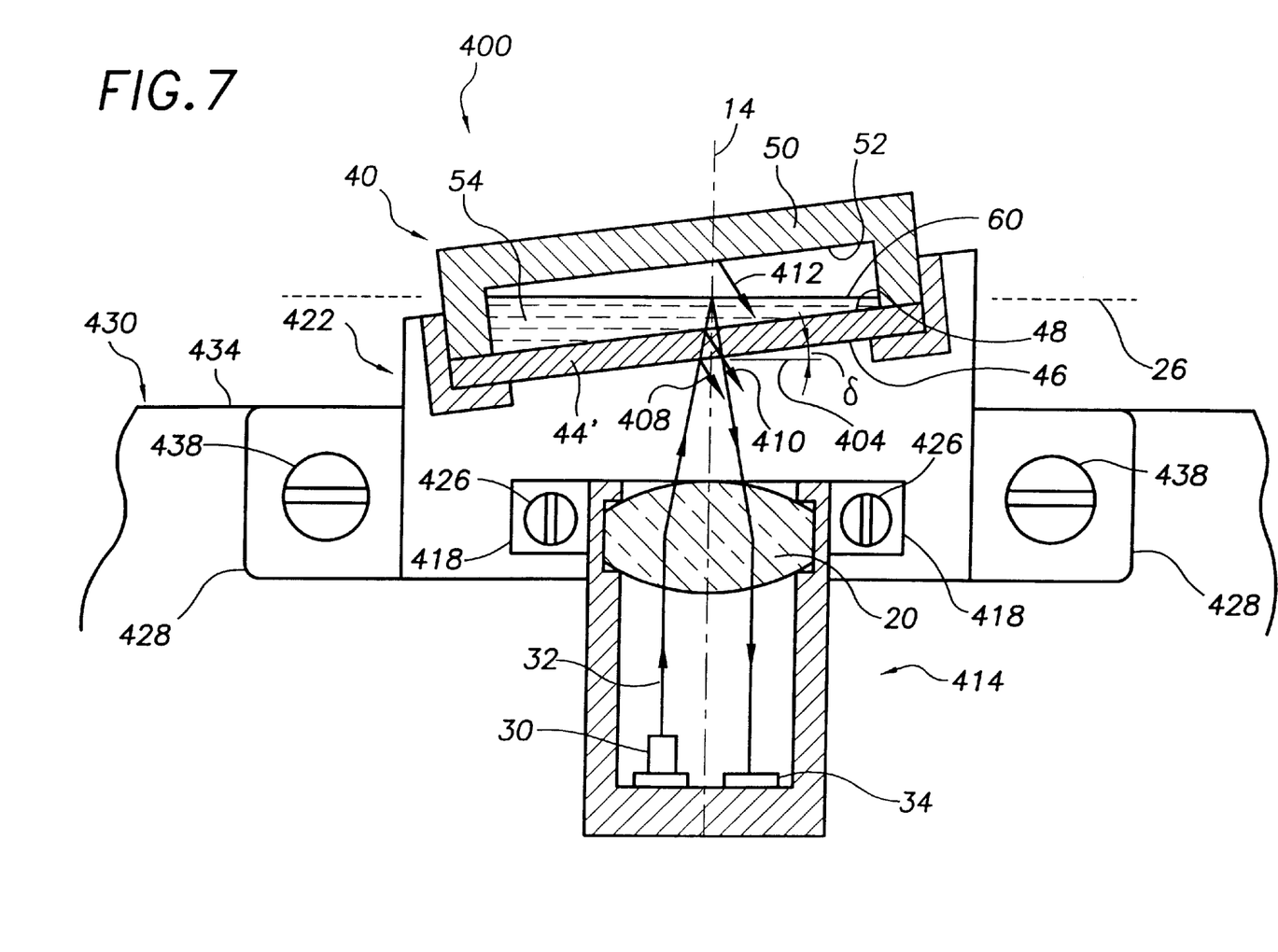
FIG. 7 is a cross-sectional view of an inclination measuring apparatus according to a third preferred embodiment of the present invention.

The present invention is particularly well-suited for inclusion on equipment whose disposition with respect to the true horizontal is important. Therefore, a third preferred embodiment of the present invention applicable to such equipment is now described. With reference to FIG. 7, there is shown an inclination measuring apparatus 400 having the same essential elements of inclination measuring apparatus 10 of FIG. 1, but with certain modifications and additional elements, as described below. As such, the operation of inclination measuring apparatus 400 is essentially identical to that of apparatus 100, and so only the differences are described below.

One modification present in inclination measuring apparatus 400 is that inner wall 44 of container 40 is a separate plate-shaped member 44'. For example, plate-shaped member 44' may be a transparent piece of glass, while the remaining walls of container 40 may be opaque. Also, container 40 is disposed at a tilt angle δ with respect to a plane 404 perpendicular to optical axis 14, as shown (note that plane 404 is parallel to rear focal plane 26). Tilting container 40 in this fashion prevents specularly reflected light such as light rays 408, 410 and 412 from reflecting from outer surface 46 of plate-shaped member 44', the interface between liquid 54 and plate-shaped member 44' at inner surface 48, and inner surface 52 of far wall 50, respectively, from reaching sensor 34. These spurious specular reflections add extra unwanted light to sensor 34 and can reduce the accuracy of the measured inclination angle. In an alternate preferred embodiment, rather than tilting the entire container 40, just plate-shaped member 44' is disposed at tilt angle δ with respect to plane 404 to reduce the spurious reflection of light rays 408 and 410 from reading sensor 34.

In addition, an anti-reflection coating or an absorptive layer may be applied to inner surface 52 of far wall 50 to reduce or eliminate spurious reflections arising therefrom, such as light ray 412. The use of a liquid 54 having an index of refraction close to the index of refraction of plate-shaped member 44' or near-wall 44 also reduces the amount of reflection from the interface of liquid 54 and inner surface 48. The precise tilt angle δ is determined based on the rear focal length $f_r$ of lens 20, the refractive index $n_p$ of plate-shaped member 44', the refractive index $n_l$ of liquid 54, and the surface area S (not shown) of sensor 34. Reducing spurious reflections from impinging on sensor 34 in the above manner increases the degree of accuracy in measuring inclination angle θ in one or two dimensions.

With continuing reference to FIG. 7, inclination measuring apparatus 400 further includes a housing 414 with screw brackets 418. Housing 414 houses lens 20, light source 30 and sensor 34. Housing 414 is mounted to a mounting plate 422 with screws 426 through screw brackets 418. Container 40 is also mounted to mounting plate 422 such that in the non-inclined state, free liquid surface 60 is coplanar with rear focal plane 26 of lens 20. Mounting plate 422 also includes screw brackets 428 and is mounted to a mounting surface 430 using screws 438 near measuring edge 434. Measuring surface 430 may be, for example, the side of a piece of equipment such as a lathe or a measuring instrument for measuring inclination.

The above-described embodiments are meant to clarify the technical details of the present invention. Since certain changes may be made in the inclination measuring apparatus disclosed herein with respect to the aforementioned preferred embodiments without departing from the scope of the invention, it is intended that all matter contained in the above description and shown in the accompanying drawings be interpreted in an illustrative and not in a limiting sense.

What is claimed is:

1. An inclination measuring apparatus comprising:
   a) a light source;
   b) a lens having an optical axis and a rear focal plane;
   c) a container filled with liquid, wherein said liquid defines a free liquid surface inside said container, said free liquid surface being substantially coincident with said rear focal plane when the inclination measuring device is in a non-inclined state; and
   d) a light-sensitive sensor, wherein said light source, said lens and said sensor are respectively arranged such that a light beam from said light source is directed through said lens to said free liquid surface, reflected by said free liquid surface, and directed to said sensor through said lens.

2. An inclination measuring apparatus according to claim 1, wherein said lens has a front focal plane and said light source and said sensor are disposed at or near said front focal plane.

3. An inclination measuring apparatus according to claim 1, wherein said light source and said sensor are arranged symmetrically to one another, with said sensor arranged along a line perpendicular to said optical axis.

4. An inclination measuring apparatus according to claim 1, wherein said container includes a non-opaque wall disposed between said liquid and said lens.

5. An inclination measuring apparatus according to claim 4, wherein said wall is a plate-shaped member.

6. An inclination measuring apparatus according to claim 4, wherein said wall is tilted at a tilt angle δ with respect to a plane perpendicular to said optical axis.

7. An inclination measuring apparatus according to claim 6, wherein said tilt angle δ is such that only said light beam reflected from said free liquid surface reaches said sensor.

8. An inclination measuring apparatus according to claim 7, wherein said lens has a rear focal length $f_r$, said wall has a refractive index $n_p$, said liquid has a refractive index $n_l$, and said sensor has a surface area S, and wherein said tilt angle δ is set as a function of $f_r$, $n_p$, $n_l$, and S.

9. An inclination measuring apparatus according to claim 1, wherein said container is tilted at a tilt angle δ with respect to a plane perpendicular to said optical axis.

10. An inclination measuring apparatus according to claim 9, wherein said tilt angle δ is such that only said light beam reflected from said free liquid surface reaches said sensor.

11. An inclination measuring device according to claim 1, wherein said liquid is one selected from the group of liquids consisting of: water, alcohol, glycerin, silicon oil, and mineral oil.

12. An inclination measuring device according to claim 1, wherein said light source is one selected from the group of light sources consisting of: light-emitting diode, and semiconductor laser.

13. An inclination measuring apparatus according to claim 1, wherein said sensor has two or more light-sensitive sensor sections.

14. An inclination measuring apparatus according to claim 13, wherein said sensor sections are line-sensors disposed in a plane and at right angles to one another.

15. An inclination measuring apparatus according to claim 13,
wherein said light source generates a light spot image, and
wherein said light spot image, after reflecting off said free liquid surface, is evenly distributed over each of said light-sensitive sensor sections when the inclination measuring apparatus is in a non-inclined state.

16. An inclination measuring apparatus according to claim 1, further including an aperture stop disposed in said front focal plane between said light source and said lens.

17. An inclination measuring apparatus comprising:
a) a lens having an optical axis, a front focal plane and a rear focal plane;
b) a light source disposed proximate said front focal plane and removed from said optical axis by a distance $X_1$ perpendicular thereto;
c) a sensor disposed proximate said front focal plane and removed from said optical axis by a distance $X_2$ perpendicular thereto in a direction opposite $X_1$;
d) a container disposed proximate said rear focal plane, said container having a non-opaque wall closest to said lens; and
e) a liquid contained in said container, said liquid having a free surface which is substantially coplanar to said rear focal plane, when the inclination measuring apparatus is in a non-inclined state.

18. An inclination measuring apparatus according to claim 17, wherein $X_1=X_2$.

19. An inclination measuring apparatus comprising:
a) a lens having an optical axis;
b) a light source, capable of emitting a light beam, disposed upstream of said lens along said optical axis;
c) a beam splitter disposed along said optical axis between said light source and said lens;
d) a container filled with liquid arranged adjacent said lens opposite said light source, wherein said liquid defines a free liquid surface inside said container;
e) a light-sensitive sensor disposed conjugate to said light source, wherein said light source, said lens and said sensor are respectively arranged such that the light beam from said light source is directed through said beam splitter and through said lens and through said liquid to said free liquid surface, reflected by said free liquid surface back through said liquid and through said lens and directed to said sensor by said beam splitter;
f) wherein said container includes a non-opaque wall disposed between said liquid and said lens; and
g) said liquid is in contact with the inner surface of said non-opaque wall.

20. An inclination measuring apparatus according to claim 19, wherein said wall is a plate-shaped member.

21. An inclination measuring apparatus according to claim 19, wherein said wall is tilted at a tilt of angle δ with respect to a plane perpendicular to said optical axis.

22. An inclination measuring apparatus according to claim 21, wherein said tilt angle δ is such that only said light beam reflected from said free liquid surface reaches said sensor.

23. An inclination measuring apparatus according to claim 22, wherein said lens has a rear focal length $f_r$, said wall has a refractive index $n_p$, said liquid has a refractive index $n_l$, and said sensor has a surface area S, and wherein said tilt angle δ is set as a function of $f_r$, $n_p$, $n_l$, and S.

* * * * *